US011637737B2

(12) United States Patent
Corley et al.

(10) Patent No.: US 11,637,737 B2
(45) Date of Patent: Apr. 25, 2023

(54) NETWORK DATA MANAGEMENT FRAMEWORK

(71) Applicant: Dell Products L.P., Round Rock, TX (US)

(72) Inventors: Scott Corley, Pflugerville, TX (US); Christopher Manning, Wokingham (GB); Michael George Roszkowski, Dublin (IE); Dean Moore, Dublin (IE); Hung Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 39 days.

(21) Appl. No.: 17/078,283

(22) Filed: Oct. 23, 2020

(65) Prior Publication Data

US 2022/0131737 A1    Apr. 28, 2022

(51) Int. Cl.
| | |
|---|---|
| *H04L 41/02* | (2022.01) |
| *H04L 41/0866* | (2022.01) |
| *G06F 16/23* | (2019.01) |
| *H04L 41/12* | (2022.01) |
| *G06F 9/54* | (2006.01) |
| *H04L 41/046* | (2022.01) |
| *H04L 67/55* | (2022.01) |

(52) U.S. Cl.
CPC .............. *H04L 41/02* (2013.01); *G06F 9/547* (2013.01); *G06F 16/2379* (2019.01); *H04L 41/046* (2013.01); *H04L 41/0866* (2013.01); *H04L 41/12* (2013.01); *H04L 67/55* (2022.05)

(58) Field of Classification Search
CPC ... H04L 41/02; H04L 41/046; H04L 41/0866; H04L 41/12; H04L 67/26; G06F 9/547; G06F 16/2379
See application file for complete search history.

(56) References Cited

U.S. PATENT DOCUMENTS

| 8,908,539 B1 * | 12/2014 | Pani | ........................ H04L 43/10 370/248 |
| 10,970,136 B1 * | 4/2021 | Devine | .................... G06F 9/547 |
| 2013/0132532 A1 * | 5/2013 | Zhang | ..................... H04L 41/08 709/220 |

(Continued)

OTHER PUBLICATIONS

Dell, "EMC Smarts Network Configuration Manager," Application Program Interface (API) Programmer's Guide, Sep. 2017, 26 pages.

(Continued)

*Primary Examiner* — Tonia L Dollinger
*Assistant Examiner* — Joseph M Cousins
(74) *Attorney, Agent, or Firm* — Ryan, Mason & Lewis, LLP

(57) ABSTRACT

A method includes receiving a plurality of inputs comprising data corresponding to a plurality of network elements, confirming presence of a given network element of the plurality of network elements on at least one network, and adding the given network element to a network element database. The method also includes interfacing with one or more network integration services of a plurality of network integration services to receive data corresponding to the given network element. The network element database is automatically updated with the received data, and the interfacing is performed via a message bus.

20 Claims, 24 Drawing Sheets

(56) References Cited

U.S. PATENT DOCUMENTS

| | | | | |
|---|---|---|---|---|
| 2014/0372428 | A1* | 12/2014 | Mathis | G06F 16/252 |
| | | | | 707/736 |
| 2015/0113118 | A1* | 4/2015 | Jain | H04L 41/145 |
| | | | | 709/224 |
| 2017/0180289 | A1* | 6/2017 | Chiappone | H04L 67/2823 |
| 2020/0204443 | A1* | 6/2020 | Bar Oz | H04L 69/18 |
| 2021/0203673 | A1* | 7/2021 | dos Santos | H04L 63/1416 |
| 2021/0218594 | A1* | 7/2021 | Sundararajan | H04L 41/145 |
| 2021/0297503 | A1* | 9/2021 | Rahn | H04L 41/5096 |
| 2021/0306333 | A1* | 9/2021 | Rolf | H04L 63/0884 |

OTHER PUBLICATIONS

Zheng Tech Blog, "About ClientListener and ServerListener," jjzheng.blogspot.com/2010/09/about-clientlistener-and-serverlistener.html, Accessed Sep. 23, 2020, 11 pages.

Cisco, "Introduction to Cisco Support APIs," https://developer.cisco.com/docs/support-apis/#leox/features, Accessed Sep. 23, 2020, 21 pages.

* cited by examiner

```
{
    "_id": bson.ObjectId,              // MongoDB Document ID
    "hostname": str,                   // Hostname of device
    "environment": str,                // Environment of device (DELL|EMC|DEV)- affects SMARTS polling
    "active": bool,                    // True if device is active, False if decommissioned
    "impact": str,                     // Impact of device outage, for CMDB population (low|medium|high)
    "contact": str,                    // email address of device owner
    "monitoring": {
        "smarts": {
            "sources": {               // SMARTS sources of device
                "$source_name": {      // name of SMARTS source
                    "id": str,         // SMARTS ID for this source
                    "last_seen": datetime   // Timestamp
                },
                "$source_name": {      // name of SMARTS source
                    "id": str,         // SMARTS ID for this source
                    "last_seen": datetime   // Timestamp
                }
            }
        }
    }
}
```

FIG. 5A

```
},
"last_seen": datetime,              // When was this device last seen in SMARTS?
"environment": "",                  // Environment Name (Dell|EMC)
"certified": str,                   // entry.content.Certification -> str
"name": {
    "display": str,                 // entry.content.DisplayName -> str.lower()
    "system": str                   // entry.content.SystemName -> str
},
"status": {
    "discovery": {
        "first": datetime,          // entry.content.DiscoveredFirstAt -> datetime
        "last": datetime            // entry.content.DiscoveredLastAt -> datetime
    },
    "manged": false,                // entry.content.IsManaged -> bool,
    "monitored": false,             // entry.content.MonitoringEnabled -> bool,
    "unresponsive": false           // entry.content.IsUnresponsive, bool
}
```

FIG. 5B 500 (cont'd)

```
},
"ncm": {
    "last_seen": datetime          // When was this device last seen in NCM
},
"bbna": {
    "last_seen": datetime          // When was this device last seen in BBNA
},
"zabbix": {
    "last_seen": datetime          // When was this device last seen in Zabbix
},
"entuity": {
    "last_seen": datetime          // When was this device last seen in Entuity
},
"poller": {
    "last_seen": datetime          // When was this device last seen by the glueball poller
},
"snmp": {                          // SNMP polled attributes
    "address": str,                // entry.content.SNMPAddress -> str
    "community": str,              // entry.content.ReadCommunity -> str
    "location": str,               // entry.content.Location -> str
    "contact": str,
    "sysoid": str                  // entry.content.SystemObjectID -> str
}
```

FIG. 5C 500 (cont'd)

```
},
"location": {
  "source": "",                  // Where the device is located
  "region": {                    // How the location was derived (snmp|hostname|url)
    "code": "",                  // Region (AMER|APAC|EMEA)
    "name": ""
  },
  "country": {
    "code": "",                  // Country
    "name": ""
  },
  "province": {
    "code": "",                  // Province/State
    "name": ""
  },
  "city": {
    "code": "",                  // Location/City
    "name": ""
  },
  "building": "",                // Building Name
  "code": "",                    // Network Site Code
  "facility": ""                 // Facility Code
```

FIG. 5D

```
},
"counts": {
    "address": int,           // number of addresses
    "port": int,              // number of ports
    "interface": int          // number of interfaces
},
"interfaces": [               // List of all the interfaces for this device
    {
        "index": int,         // SNMP index of interface
        "name": str,          // Name of interface
        "description": str,   // Description of interface
        "addresses": [        // Contains all IP Addresses assigned to this interface
            {
                "address": str,   // IP Address
                "network": str    // Network ID in CIDR notation
            },
            {
                "address": str,
                "network": str
            }
        ]
    }
],
"access_points": []           // List of wireless access points associated with the
                              // device if the device is a wireless controller
}
```

FIG. 5E

```
501
{
  "_id": bson.ObjectId(),      // Physical Inventory Item
                               // MongoDB Document ID
  "type": str,                 // Type of device (chassis|card|switch|member)
  "status": str,               // State of hardware: (deployed|stored|disposed)
  "parent": bson.ObjectId,     // ObjectId of parent logical device
  "serial": str,               // Serial Number (if it has one)
  "svctag": str,               // Service Tag (if it has one)
  "vendor": str,               // Device manufacturer
  "model": str,                // Device model number
  "version": str,              // OS or Firmware version
  "contact": str,              // email address of device owner
  "eol": {                     // End of Life information for this physical device
    "productId": str,          // Manufacturer's Product ID
    "checked": datetime,       // When this eol info was last checked
    "lastDay": datetime        // The last day this device should be online
  },
  "location": {                // Location (copied from logical device)
    "source": "",              // How the location was derived (snmp|hostname|url)
    "region": {                // Region (AMER|APAC|EMEA)
      "code": "",
      "name": ""
```

FIG. 5F 501 (Cont'd)

```
},
"country": {
    "code": "",         // Country
    "name": ""
},
"province": {
    "code": "",         // Province/State
    "name": ""
},
"city": {
    "code": "",         // Location/City
    "name": ""
},
"building": "",         // Building Name
"code": "",             // Network Site Code
"facility": ""          // Facility Code
},
"room": str,            // Room name
"row": str,             // Row
"rack": str,            // Rack
"elevation": str        // U position
}
```

FIG. 5G

```
<!-- IBM MQ JMS -->
<bean id="ibmQueueConnectionFactory"
class="com.ibm.mq.jms.MQQueueConnectionFactory" autowire="no"
primary="true">
<property name="hostName" value="${ibm.mq.host}" />
<property name="port" value="${ibm.mq.port}"/>
<property name="queueManager" value="${ibm.mq.queue.manager}" />
<property name="channel" value="${ibm.mq.channel}" />
<property name="transportType" >
<util:constant static-
field="com.ibm.mq.jms.JMSC.MQJMS_TP_CLIENT_MQ_TCPIP" />
</property>
</bean>
```

```xml
<!-- JMS Queue Connection Factory -->
<bean id="jmsSourceQueueConnectionFactory"
class="org.springframework.jms.connection.SingleConnectionFactory">
    <property name="targetConnectionFactory" ref="ibmQueueConnectionFactory" />
</bean>
<!-- JMS Destination Resolver -->
<bean id="jmsSourceDestinationResolver"
class="org.springframework.jms.support.destination.DynamicDestinationResolver" />
<!-- JMS Queue Template -->
<bean id="jmsQueueTemplate" class="org.springframework.jms.core.JmsTemplate">
    <property name="connectionFactory" ref="jmsSourceQueueConnectionFactory" />
    <property name="destinationResolver" ref="jmsSourceDestinationResolver" />
    <property name="pubSubDomain" value="false" />
    <property name="receiveTimeout" value="2000" />
</bean>
```

FIG. 9B

```
<bean id="reading_From_IBM_MQ" class="com.ibm.mq.jms.MQQueue" >
<constructor-arg value="${ibm.mq.queue.name}" />
<property name="targetClient">
<util:constant static-field="com.ibm.mq.jms.JMSC.MQJMS_CLIENT_JMS_COMPLIANT" />
</property>
</bean>
<!-- mq_Error_Channel is for error caused during the process-->
<int:channel id="mq_Error_Channel"> </int:channel>
<!-- Reading the messages from IBM MQ queue to channel -->
<int-jms:message-driven-channel-adapter id="recieve_Message_From_IBM" channel="amqp_Out_Channel"
error-channel="mq_Error_Channel"
concurrent-consumers="${concurrent-consumers}" max-concurrent-consumers="${max-concurrent-consumers}"
destination="reading_From_IBM_MQ"
connection-factory="jmsSourceQueueConnectionFactory"/>
```

FIG. 9C 900 (cont'd)

```xml
<!-- pushing the failed messags to the Queue which is read from the IBM MQ Queue -->
<int-jms:outbound-channel-adapter id="sendMessagetoIBM" channel="mq_Error_Channel"
destination="reading_From_IBM_MQ"
connection-factory="jmsSourceQueueConnectionFactory"/>
</int-jms:outbound-channel-adapter>
<!-- ================================================ -->
<!-- Rabbit MQ amqp configuration -->
<!-- ================================================ -->
<!-- Abstract rabbit template which can be used to create multiple rabbit
templates based on connection factories -->
<bean id="abstractRabbitTemplate"
class="org.springframework.amqp.rabbit.core.RabbitTemplate" abstract="true" />
```

FIG. 9D 900 (cont'd)

```
<bean id="ConnectionFactory" class="org.springframework.amqp.rabbit.connection.CachingConnectionFactory"
  abstract="false">
<property name="host" value="${rabbit.mq.host}" />
<property name="port" value="${rabbit.mq.port}" />
<property name="virtualHost" value="${rabbit.mq.virtual-host}" />
</bean>
<rabbit:template id="amqp_Template" connection-factory="ConnectionFactory" />
<!-- pushing to the rabbit mq -->
<int:channel id="amqp_Out_Channel"></int:channel>
<int-amqp:outbound-channel-adapter id="write_Message_To_Rabbit_MQ" routing-key="${rabbit.mq.queue.name}"
  channel="amqp_Out_Channel" amqp-template="amqp_Template" exchange-name="">
</int-amqp:outbound-channel-adapter>
```

FIG. 9E

NETWORK DATA MANAGEMENT FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to computing environments, and more particularly to techniques for processing information associated with network elements.

BACKGROUND

Inventories of network elements such as, for example, network devices, components and other network objects may contain different types of data associated with the network elements. Such data can include, for example, element types, network addresses and other identifying information about the network elements. There are numerous challenges associated with the creation and maintenance of accurate and trustworthy inventories for network objects. For example, current network inventory solutions utilize network monitoring tools to provide information about network elements to an inventory database. However, the network monitoring tools are not equipped to effectively interface with all network elements and/or with other tools and processes needed to obtain different types of network element data. There are often issues with network monitoring tool application programming interfaces (APIs) leading to lost or missing network objects from inventories. In addition, problems or malfunctions with the network monitoring tools further contribute to inaccuracies in and unreliability of network object inventories.

Current network inventory solutions are also slow and cumbersome to update, relying on antiquated interfaces that are not efficient, and which fail to provide computing engineers with information they need about network elements.

SUMMARY

Illustrative embodiments provide techniques for network data management. For example, some embodiments include techniques for creating and maintaining a network element inventory and interfacing with multiple integration services.

In one embodiment, a method comprises receiving a plurality of inputs comprising data corresponding to a plurality of network elements, confirming presence of a given network element of the plurality of network elements on at least one network, and adding the given network element to a network element database. The method also includes interfacing with one or more network integration services of a plurality of network integration services to receive data corresponding to the given network element. The network element database is automatically updated with the received data, and the interfacing is performed via a message bus.

Advantageously, in one or more embodiments, a network data management platform interfaces with multiple network monitoring and configuration tools to determine the presence of network elements in real-time and extract network element details to augment network element data in a network element database.

These and other illustrative embodiments include, without limitation, methods, apparatus, networks, systems and processor-readable storage media.

BRIEF DESCRIPTION OF THE DRAWINGS

FIGS. 5A-5E depict a data taxonomy for a logical inventory item in an illustrative embodiment.

FIGS. 5F-5G depict a data taxonomy for a physical inventory item in an illustrative embodiment.

FIGS. 9A-9E depict example pseudocode for sending messages between different message-oriented middleware (MOM) providers in illustrative embodiments.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
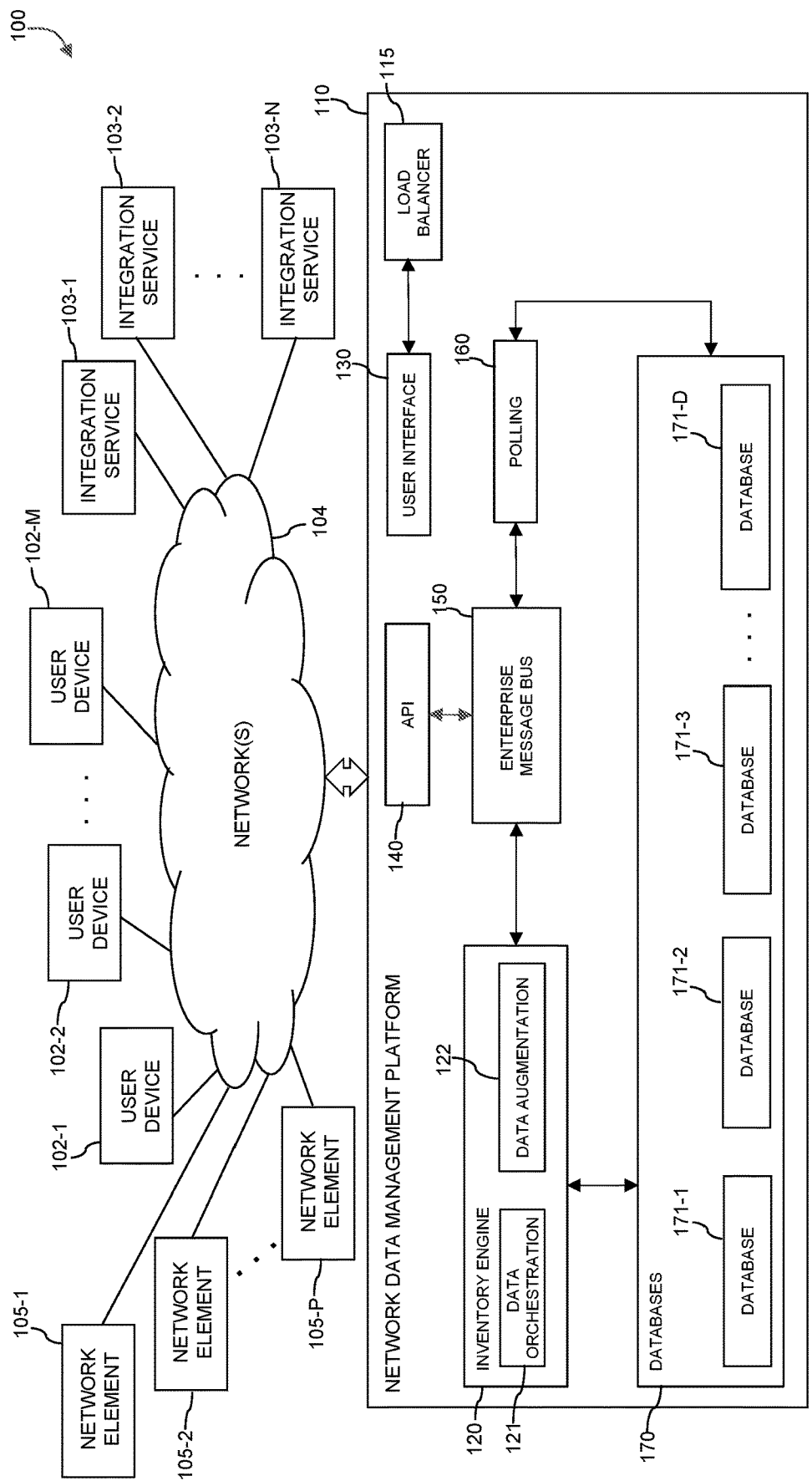
FIG. 1 is a block diagram of an information processing system comprising a network data management platform configured for generating, maintaining and updating a network element inventory in an illustrative embodiment.

FIG. 1 shows an information processing system 100 configured in accordance with an illustrative embodiment. The information processing system 100 comprises user devices 102-1, 102-2, . . . 102-M (collectively "user devices 102"), integration services 103-1, 103-2, . . . 103-N (collectively "integration services 103"), and network elements 105-1, 105-2, . . . 105-P (collectively "network elements 105"). The user devices 102 and communicate over a network 104 with a network data management platform 110.

The user devices 102 can comprise, for example, Internet of Things (IoT) devices, desktop, laptop or tablet computers, mobile telephones, or other types of processing devices capable of communicating with the network data management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as D, K, L, N, P and S are assumed to be arbitrary positive integers greater than or equal to two.

The network elements 105 comprise, for example, but are not necessarily limited to, servers, storage devices (e.g., hard drives), chassis, display panels, motherboards, controllers, cards, processors, ports, host bus adaptors (HBAs), speakers, keyboards, memories, switches, routers or other devices, assets or objects of a network. Network elements can be logical and physical elements of the network.

The integration services 103 comprise, for example, services that perform functions such as, but not necessarily limited to, monitoring of network elements 105 (e.g., information technology (IT) infrastructure monitoring), management and enforcement of network element configurations, performance management of network elements 105 (e.g., bandwidth utilization, throughput, latency, memory capacity and usage, response and completion time and channel capacity), lifecycle management of network elements 105 and location tracking of network elements 105. The integration services 103 can be affiliated with one or more enterprises and can be internally controlled and managed by the enterprise or externally controlled by an outside entity with respect to the enterprise. The integration services 103 may comprise microservices including, but not necessarily limited to, collections of loosely coupled, fine-grained and parallelized services implementing lightweight protocols.

As used herein, a "taxonomy" or "data taxonomy" refers to a system for organizing data. Taxonomies assist with the identification and retrieval of electronic content, and are useful for identifying and retrieving electronic content corresponding to particular topics that may be, for example, targeted to specific users in a network data management scenario or the subject of a search or query.

The term "client," "customer," "administrator" or "user" herein is intended to be broadly construed so as to encompass numerous arrangements of human, hardware, software or firmware entities, as well as combinations of such entities. At least a portion of the available services and functionalities provided by the network data management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the network data management platform 110, as well as to support communication between the network data management platform 110 and connected devices (e.g., user devices 102) and/or other related systems and devices not explicitly shown.

In some embodiments, the user devices 102 are assumed to be associated with repair technicians, system administrators, information technology (IT) managers, software developers or other authorized personnel configured to access and utilize the network data management platform 110.

The network data management platform 110 in the present embodiment is assumed to be accessible to the user devices 102, the integration services 103, the network elements 105 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The network data management platform 110, on behalf of respective infrastructure tenants each corresponding to one or more users associated with respective ones of the user devices 102, creates and maintains a reliable and trustworthy authoritative inventory for network objects (also referred to herein as a "source of truth"). The network data management platform 110 utilizes an inventory engine comprising an inventory of network elements to verify the presence of the network elements on a network and to interface with one or more integration services to retrieve additional data about the network elements. The inventory engine updates the inventory based on the retrieved data. The network data management platform 110 further utilizes an enterprise message bus to process requests and transport messages using different messaging protocols. The network data management platform also provides an improved user interface and application programming interface (API) to enable users to input new network elements and/or retrieve data on existing network elements.

Referring to FIG. 1, the network data management platform 110 includes a load balancer 115, an inventory engine 120, a user interface component 130, an API component 140, an enterprise message bus 150, a polling engine 160 and a databases component 170. The inventory engine 120 includes a data orchestration component 121 and a data augmentation interface component 122. The databases component 170 comprises a plurality of databases 171-1, 171-2, 171-3, ... 171-D (collectively "databases 171").

Figure 3:
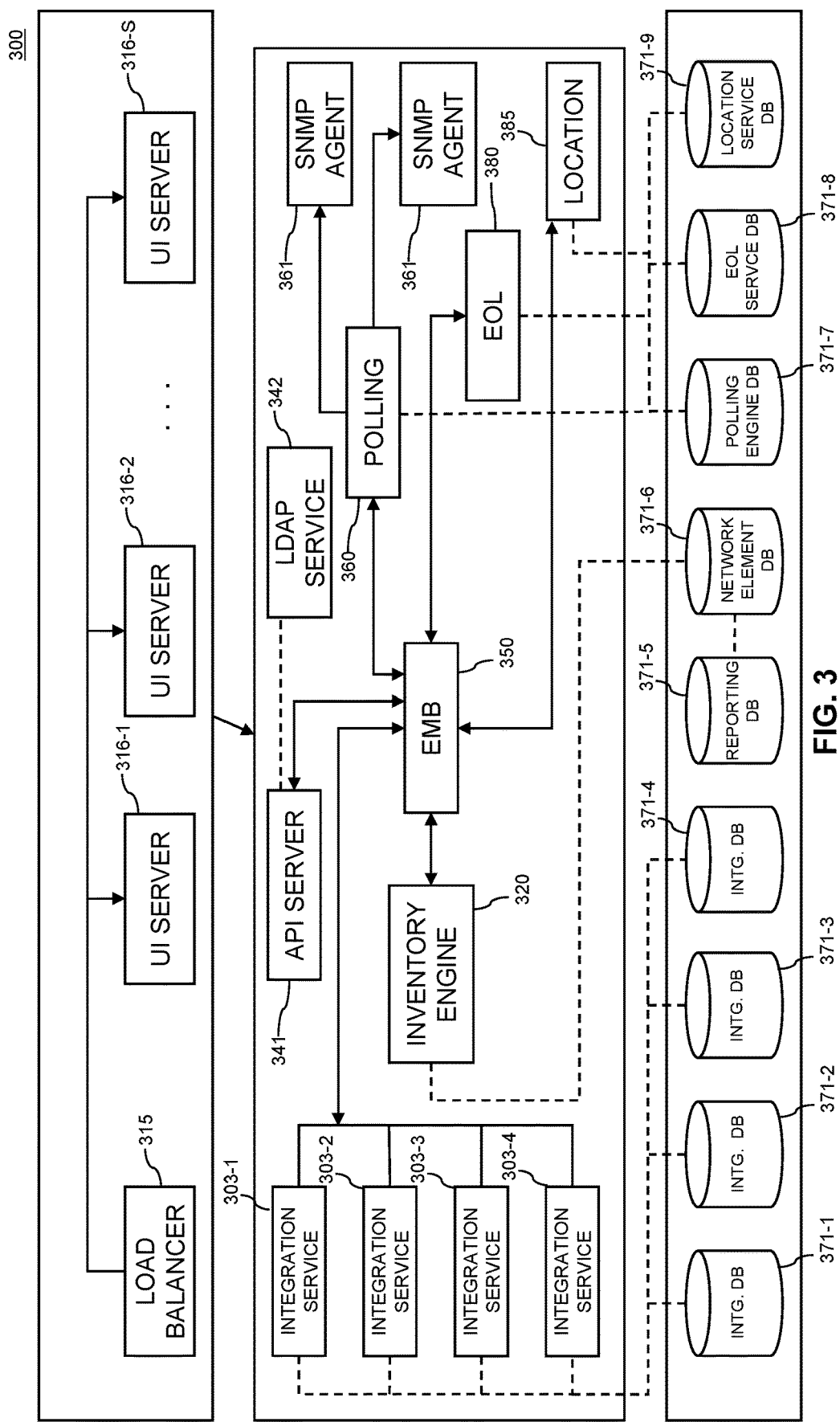
FIG. 3 is a block diagram of a microservice architecture for network data management in illustrative embodiments.

Referring to FIGS. 1 and 3, a user is provided with a user interface on one of the user devices 102. The user interface is generated by the user interface component 130 and includes fields for entering network element identifying information, such as, for example, Internet Protocol (IP) address, community string and environment. The community string comprises, for example, an access code, like a password. The environment specifies an environment, such as, for example a legacy environment or a new environment in case there are duplicate IP addresses associated with two different environments. Utilizing the interface and completing the fields, a user may add a new network element 105 to a network element inventory, or specify information to be retrieved about an existing network element 105 already in the network element inventory. Additional tasks that a user may trigger via the user interface include, but are not necessarily limited to, changing or modifying a network element and moving a network element. In the case of adding a new network element to the inventory, the interface may include an option to add the network element 105, and upon selection of that option via the interface, the polling engine 360 (or polling engine 160 in FIG. 1) through a simple network management protocol (SNMP) agent 361 performs a check to see whether the new network element is reachable based on the provided IP address, community string and environment, and verifies the presence of the network element on the network. This verification is performed in real-time following selection of the add option on the interface by a user. A verified network element 105 is added to the authoritative network element database 371-6 (also represented as one of the databases 171 in FIG. 1).

The load balancer 115/315 routes incoming requests for user interfaces to one of a plurality of available user interface (UI) servers 316-1, 316-2, ... 316-S (collectively "UI servers 316") based on criteria relating to, for example, maximizing speed and efficiency to avoid degraded performance. The selected one of the UI servers 316 connects to an API server 341 running an API such as, for example, a REST API. The API component 140 in FIG. 1 includes an API server running an API. According to an embodiment, the API can be accessed by a user, such as, for example, a network engineer without utilizing the user interface. In this scenario, the user provides inputs to the API using compatible code. These inputs can be similar in purpose to the inputs that may be received via the user interface, and may include commands, for example, to add a network element, to change or modify a network element, to retrieve data about a network element and to move a network element.

Referring to FIG. 3, the API server 341 is connected to a lightweight directory access protocol (LDAP) service 342, which can be used for directory services authentication. For example, directory services store user information, passwords, and computer account information, and share this data with other entities on a network. The API server 341 sends messages comprising the user inputs from the UI servers 316 or the user inputs received directly to the API server 341, to the enterprise message bus (EMB) 350 (150 in FIG. 1). In a situation where a network element 105 is being verified as noted above, the EMB 350 sends a verification request to the polling engine 360 (160 in FIG. 1) which utilizes an SNMP agent to verify the presence of the network element 105 on the network 104. The SMNP agent communicates with the network element 105 and a response regarding whether the network element 105 exists is provided to a user via the user interface or the API in real-time from when the user request to add the network element was received. The results of the verification can be stored in a polling engine database 371-7, which may be one of the databases 171 in FIG. 1.

Once network elements 105 are verified, the network elements 105 are added to the authoritative network element database 371-6 (e.g., source of truth) and can be added to one or more integration services 103 for monitoring or other tasks corresponding to the particular integration service. Integration services 303-1, 303-2, 303-2 and 303-4 (collectively "integration services 303) are also shown in FIG. 3. The number of integration services 303 shown in FIG. 3 is by way of example, and more or less integration services may be used in the system 300. According to one or more embodiments, network elements 105 must fit a specified profile to be added to a given integration service. For example, the inventory engine 120 applies a plurality of rules to determine to which of the plurality of network integration services 103 a new network element should be added. In a non-limiting example, edge routers require monitoring of bandwidth utilization, and a rule may be programmed that requires edge routers to be added to an integration service 103 that monitors bandwidth utilization.

Figure 4A:
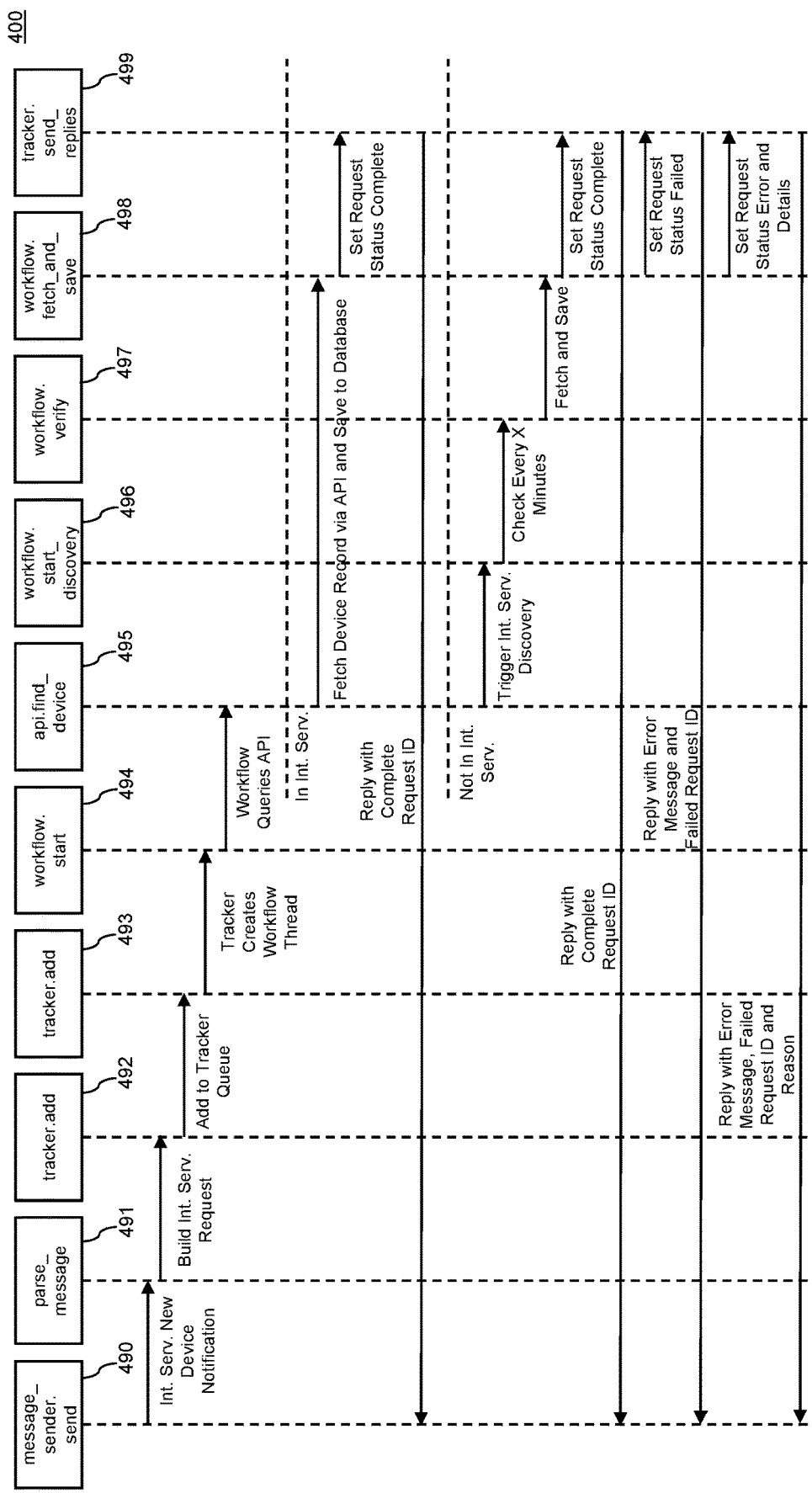
FIGS. 4A and 4B are sequence diagrams for network data management in illustrative embodiments.
Figure 4B:
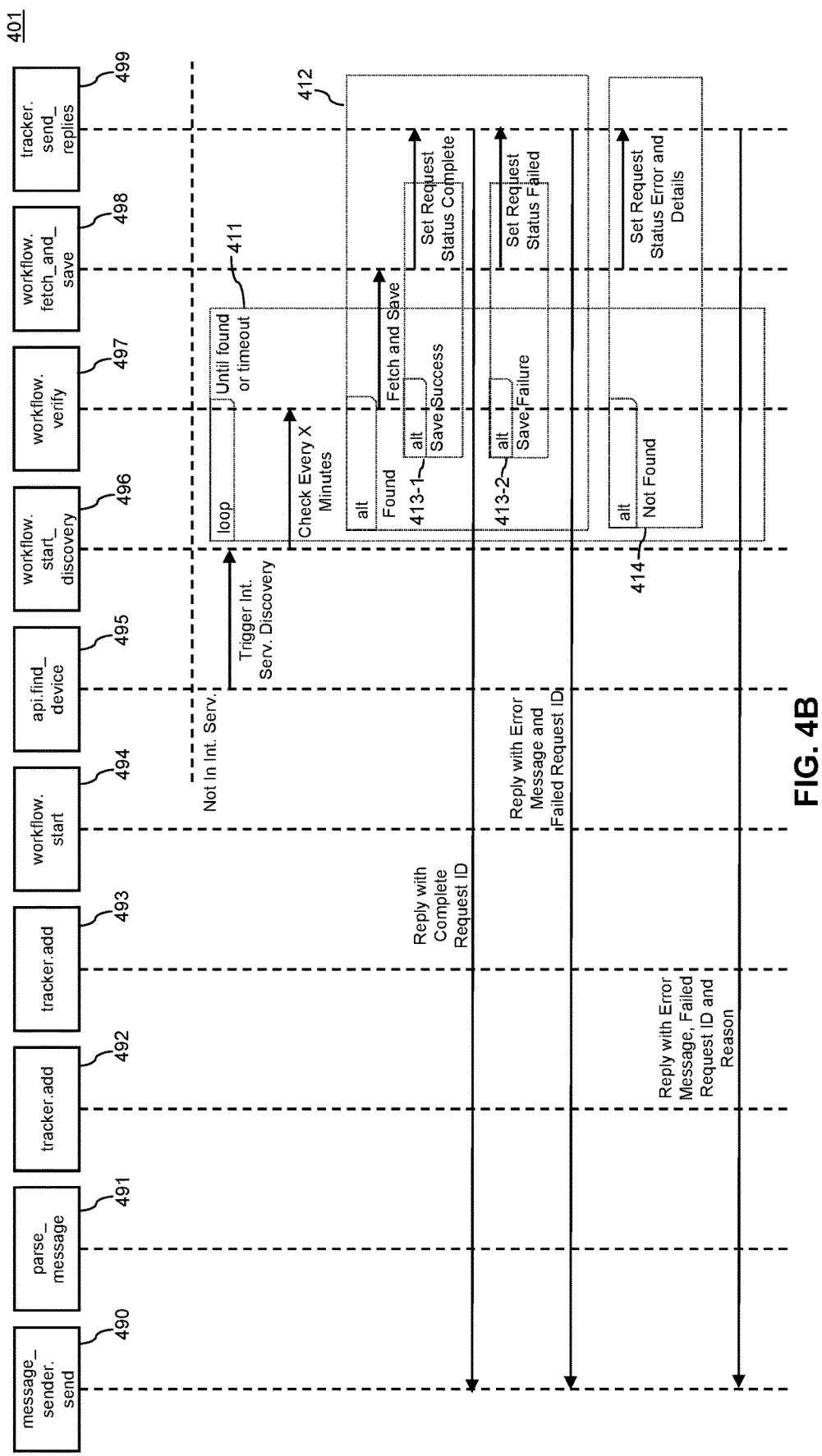

Referring to the sequence diagrams 400 and 401 in FIGS. 4A and 4B, processing for determining whether a network element 105 has already been identified by an integration service and, if not, processing for adding the network element 105 to the integration service are illustrated. For purposes of FIGS. 4A and 4B, the network element is referred to as a device, but the embodiments are not necessarily limited thereto.

Referring to FIG. 4A, a new device notification (message_sender.send 490) is sent via the EMB 150/350 to a given one of the integration services (103/303). The message is parsed (parse_message 491) and an integration service request is generated (tracker.add 492). The request is added to a tracker queue (tracker.add 492) and a workflow thread is created (workflow.start 494). The workflow queries the integration service API (api.find_device 495) to search for the new device to see if the device is already being serviced by the integration service. If the new device has already been identified by the integration service to be serviced by the integration service (e.g., monitoring, data gathering, tracking, etc.) ("In Int. Serv."), the device record is fetched via the integration service API, saved to a database (e.g., one of the integration service databases 371-1, 371-2, 371-3 or 371-4 in FIG. 3) (workflow.fetch_and_save 498), and a request status is set to complete. A reply is generated and sent back to a user via the EMB 150/350 (tracker.send_replies 499). In this case, the reply indicates that the network element is part of the given integration service and includes a "complete request" identifier indicating that the request has been successfully completed. The indication can appear, for example, on the user interface. The integration service will henceforth perform its services (e.g., monitoring, data gathering, tracking, etc.) with respect to the new device, and provide data back to the inventory engine 120/320 corresponding to the performance of the services.

Referring to FIGS. 4A and 4B, if the new device has not been identified by the integration service to be serviced by the integration service (e.g., monitoring, data gathering, tracking, etc.) ("Not In Int. Serv."), a search for the device is performed by the integration service (workflow.start_discovery 496 and workflow.verify 497). For example, referring to the "loop" block 411, a periodic check (e.g., every X minutes) is performed until the device is found or the check times out. Referring to the "alt found" block 412, if the device is found on the network by the integration service, the device is added to the integration service such the integration service will henceforth perform its services (e.g., monitoring, data gathering, tracking, etc.) with respect to the new device, and provide data back to the inventory engine 120/320 corresponding to the performance of the services. Referring to block 413-1, in the case that the new device is successfully added to the integration service and saved to the integration service database (workflow.fetch_and_save 498), a request status is set to "complete," and a reply is generated and sent back to a user via the EMB 150/350 (tracker.send_replies 499). This reply is similar to the reply in connection with a device already being in the integration service. Referring to block 413-2, in the case that the new device is not able to be successfully added to the integration service and is not saved to the integration service database, a request status is set to failed, and a reply is generated and sent back to a user via the EMB 150/350 (tracker.send_replies 499). This reply includes an error message and a "failed request" identifier indicating that the request was not successful. The error message may indicate that the new device was found, but not able to be added to the integration service.

Referring to the "alt not found" block 414, if the periodic check times out without the device having been found by the integration service, the request status is set to "error and details," and a reply is generated and sent back to a user via the EMB 150/350 (tracker.send_replies 499). This reply includes an error message, a "failed request" identifier indicating that the request was not successful, and a reason for the failed request. The error message may indicate that the new device was not found, and include a reason why the new device was not found (e.g., incorrect device identifier, malfunction with the network or integration service, etc.).

Figure 2A:
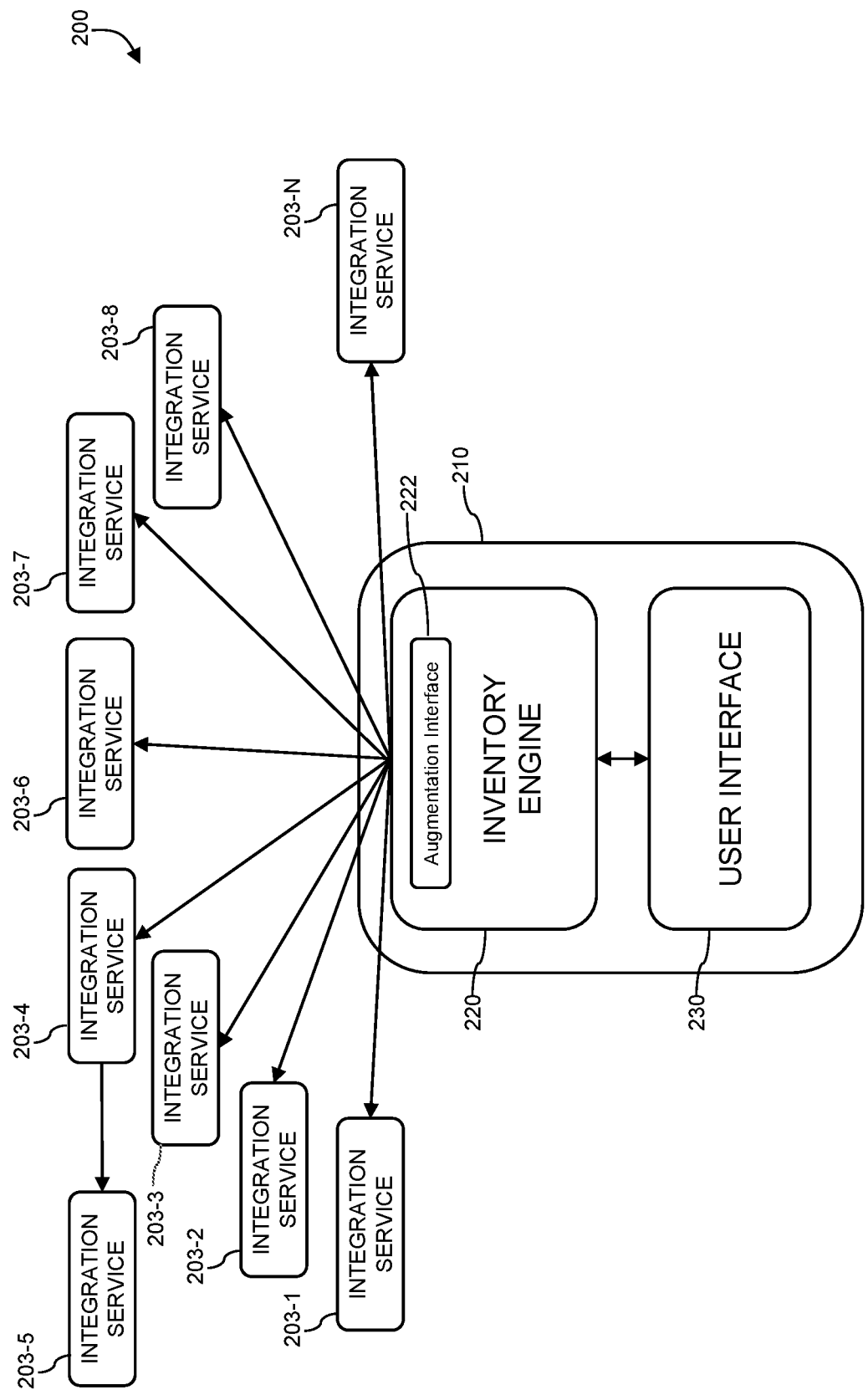
FIGS. 2A and 2B are block diagrams of a network data management platform interfacing with a plurality of integration services in an illustrative embodiment.
Figure 2B:
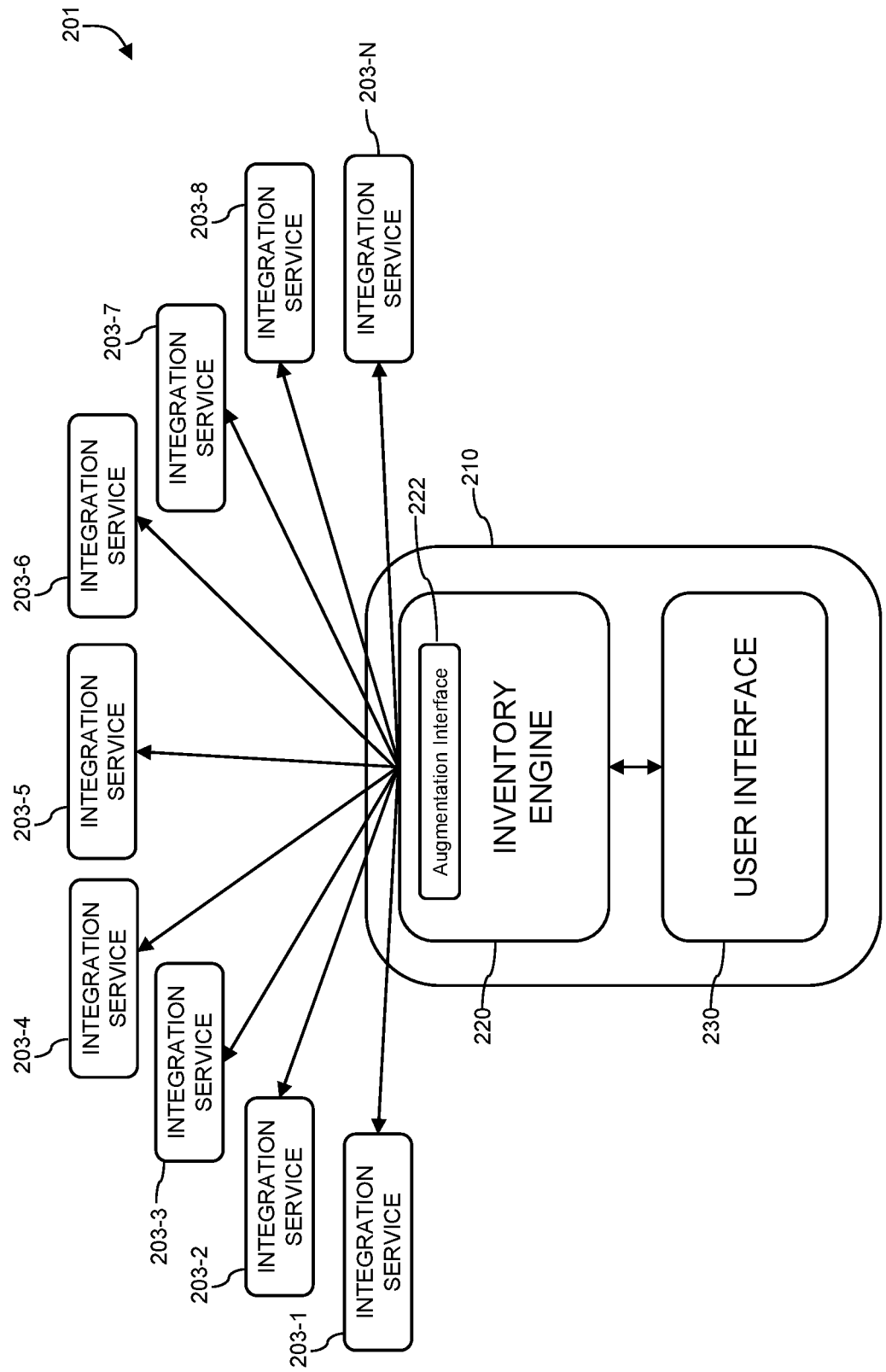

Once network elements are added to one or more of the integration services 103/303 for monitoring or other services performed by the integration services 103/303, the inventory engine 120/320 interfaces with the integration services 103/303 to receive data corresponding to the network elements 105 that are serviced by the integration services 103/303. For example, referring to the systems 200 and 201 in FIGS. 2A and 2B, an inventory engine 220 of a network data management platform 210 interfaces with a plurality of integration services 203-1, 203-2, 203-3, 203-4, 203-5, 203-6, 203-7, 203-8, . . . 203-N (collectively "integration services 203") via a data augmentation interface component 222, which is the same as or similar to the data augmentation interface component 122 in FIG. 1. Similar to the user interface component 130 of the network data management platform 110, the network data management platform 210 also includes a user interface component 230. In the system 201, the inventory engine 220 directly accesses all of the integration services 203 through the data augmentation interface component 222. In the system 200, the inventory engine 220 indirectly accesses at least one integration service 203-5 through another integration service 203-4 and the data augmentation interface component 222. In other respects, the systems 200 and 201 are the same.

The inventory engine 120 includes a data orchestration component 121 including core reconciliation logic, which combines data about the network elements 105 received from various integration services 103 to create the authoritative inventory of network elements (e.g., source of truth), which can be stored in one of the databases 171/371 (e.g., authoritative network element database 371-6). The data about the network elements 105 received from the integration services 103 comprises, but is not necessarily limited to, results of monitoring of network elements 105 (e.g., IT infrastructure monitoring), data corresponding to network element configurations, data corresponding to performance of the network elements 105 (e.g., bandwidth utilization, throughput, latency, memory capacity and usage, response and completion time and channel capacity), data corresponding to lifecycles of the network elements 105 (e.g., end-of-life (EOL) data) and data corresponding to physical and logical locations of the network elements 105 (e.g., IP addresses, logical partitions, virtual machines (VMs)).

In an embodiment, the integration services 103 can use the EOL service 380 to gather EOL data for network elements 105. For example, an EOL service may provide an API which supports a RESTful interface, supports JSON data format, and includes web services that return, for example, EOL information for specified date ranges, EOL information for specified network element IDs, EOL information for specified network element serial numbers, and EOL product information for specified network element software release strings, as well as the EOL information noted below in connection with FIGS. 5F-5G. The EOL information can be stored in an EOL service database 371-8, which can be one of the databases 171 noted in FIG. 1.

In an embodiment, the integration services 103 can use the location service 385 to gather location data for network elements 105. For example, a location service may provide an API which supports a RESTful interface, supports JSON data format, and includes web services that return, for example, IP addresses, logical partition location information and VM location information, as well as the location information noted below in connection with FIGS. 5A-5E and FIGS. 5F-5G. The location information can be stored in location service database 371-9, which can be one of the databases 171 noted in FIG. 1.

Referring, for example, to FIGS. 5A-5E and FIGS. 5F-5G, the received data from the integration services 103 comprises physical and logical inventories of the network elements 105. As shown in FIGS. 5A-5E, a data taxonomy 500 for a logical inventory item comprises, for example, a device host name, a device environment, an indication of whether the device is active and/or responsive, an indication of an impact of a device outage, contact information for a device owner (e.g., email address), integration service source(s) and identifier(s) corresponding to the device, timestamp(s) indicating when the device was last seen by the integration service(s) and/or polling agents and when the device was discovered by the integration service(s), data indicating whether the device is being managed and/or monitored by the integration service(s) and data relating to polled attributes of the device. The data taxonomy 500 also includes location data for the device including, but not necessarily limited to, how location was derived (e.g., SNMP hostname, device location string), region, country, province/state, city, building name, network site code, and facility code. The data taxonomy 500 also includes data corresponding to a number of addresses, a number of ports, a number of interfaces and identifying information of the interfaces (e.g., name, SNMP index, description and IP addresses assigned to the interface), wireless access points associated with the device if applicable.

As shown in FIGS. 5F-5G, a data taxonomy 501 for a physical inventory item comprises data corresponding to the type of device (e.g., chassis, card, switch, member), a state of the hardware (e.g., deployed, stored, disposed), object identifier of a parent logical device, serial number, service tag, device manufacturer, manufacturer's product identifier, device model number, operating system or firmware version, contact information for the device owner (e.g., email address), end of life (EOL) information for the device, when EOL information was last checked and the last day the device should be online.

Similar to the logical item inventory, the data taxonomy 501 also includes location data for the physical device including, but not necessarily limited to, how location was derived (e.g., SNMP hostname, device location string), region, country, province/state, city, building name, network site code and facility code. Additional location data in the data taxonomy 501 comprises room name, row, rack and elevation position.

The data taxonomies are variable based on the data collected from the integration services and/or the types of devices. Unlike conventional database taxonomies which can have, for example, structured rows and columns designating particular categories, the structure of the data taxonomies according to the embodiments is dynamic based on the type and content of data collected. Data taxonomies, like the taxonomies 500 and 501 for logical and physical network elements, are added to the authoritative network element database 371-6.

For network elements 105 in the authoritative inventory (e.g., source of truth), the inventory engine 120/220/320 periodically audits (e.g., once/week, once/day, etc.) the status of the network elements 105. Such auditing includes, for example, using a polling agent (e.g., SMNP agent 361) to determine whether the network element 105 remains as part of the network. If the network element 105 is no longer in the network, the authoritative inventory self-updates with an indication that the element has been unreachable for a designated number of times. In this case, a notification can be sent to a user via, for example, the user interface, indicating that the network element is not able to be reached. Auditing may also include, for example, requesting data from the integration services 103/203/303 about the network elements 105. Such data may be requested periodically (e.g., once/week, once/day, etc.) and include, for example, monitoring results, network element configurations, network element performance, network element lifecycles, and physical and logical locations of the network elements 105. The data may further include additional network element details noted, for example, in the taxonomies 500 and 501. The authoritative inventory (e.g., source of truth) self-updates with the results of the auditing, and updates the authoritative network element database 371-6. In addition, as shown in FIG. 3, data from the authoritative network element database 371-6 can be transmitted to a reporting database 371-5, which includes data about the network elements 105 to be reported to users via, for example, user interfaces on user devices 102 or via an API. Auditing may also be performed on-command in response to a user request to perform auditing.

As shown in FIG. 3, the integration services 303, the inventory engine 320, the API server 341, the polling engine 360, EOL service 380 and location service 385 all transmit and receive data via the EMB 350. Like the integration services 303, the inventory engine 320, the API server 341, the polling engine 360, EOL service 380 and location service 385 can comprise microservices. The EMB 350 (as well as EMB 150 in FIG. 1) is configured to transport messages between different message-oriented middleware (MOM) providers, which use different protocols for data exchange. For example, referring to the EMB 650 in FIG. 6, requests and/or data may come into the EMB 650 using a first data exchange protocol associated with a source MOM provider and be directed to a target MOM provider using a second data exchange protocol different from the first data exchange protocol. For example, transmissions may originate from any of the integration services 303, the inventory engine 320, the API server 341, the polling engine 360, EOL service 380 and location service 385 using the first data exchange protocol and be directed to any of the integration services 303, the inventory engine 320, the API server 341, the polling engine 360, EOL service 380 and location service 385 using the second data exchange protocol. In accordance with one or more embodiments, the EMB 150/350/650 provides access to any MOM provider, wherein the MOM providers are of different types, and require different functionality or implementations of machine-to-machine (M2M) messaging protocols. In a non-limiting example, the MOM providers can respectively correspond to different MOM servers from different sources, which run different software and have different capabilities. Some non-limiting examples of MOM providers which may be compatible with the EMB 150/350/650 are RabbitMQ® (Pivotal Software, Inc., San Francisco, Calif.) (601 in FIG. 6), IBM® MQ (International Business Machines Corporation, Armonk, N.Y.) (602 in FIG. 6) and Apache™ Kafka® (Apache Software Foundation, Wakefield, Mass.) (603 in FIG. 6). According to one or more embodiments, the one or more MOM servers are operated by a single enterprise.

Figure 6:
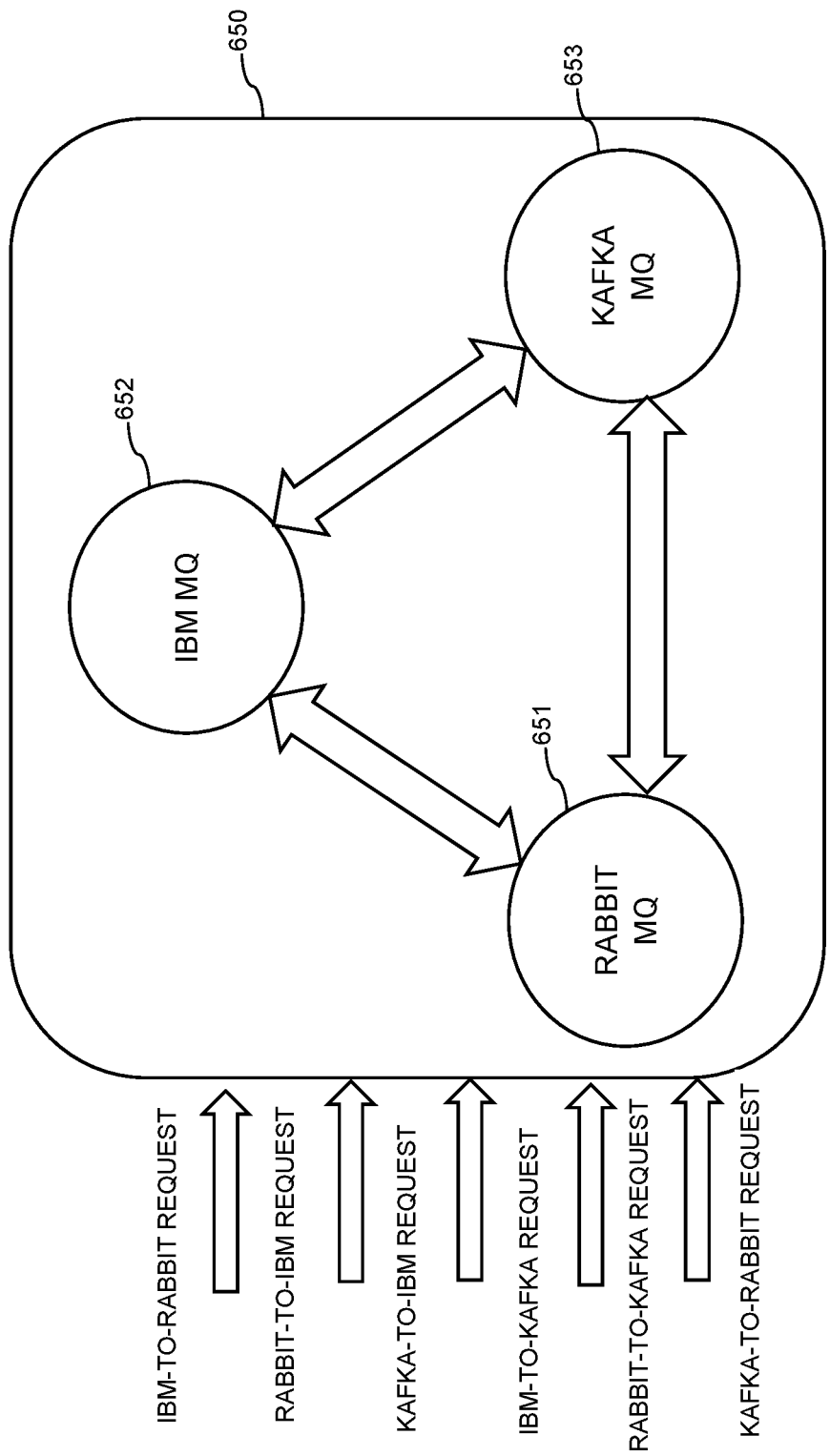
FIG. 6 is a block diagram of an enterprise message bus interface in an illustrative embodiment.

For example, referring to FIG. 6, the EMB 150/350/650 is configured to process IBM-to-Rabbit, Rabbit-to-IBM, Kafka-to-IBM, IBM-to-Kafka, Rabbit-to-Kafka and Kafka-to-Rabbit requests. Referring to FIG. 3, the EMB 350 is compatible with each of the integration services 303, the inventory engine 320, the API server 341, the polling engine 360, EOL service 380 and location service 385 and each of the MOM providers. The MOM providers, via their servers, permit data exchange between distributed applications by sending and receiving messages. The MOM servers include architectures with, for example, APIs and administrative tools to route and deliver messages. The embodiments provide a generic and implementable interface to the EMB 150/350/650 that is agnostic of different MOM provider technologies.

Figure 7:
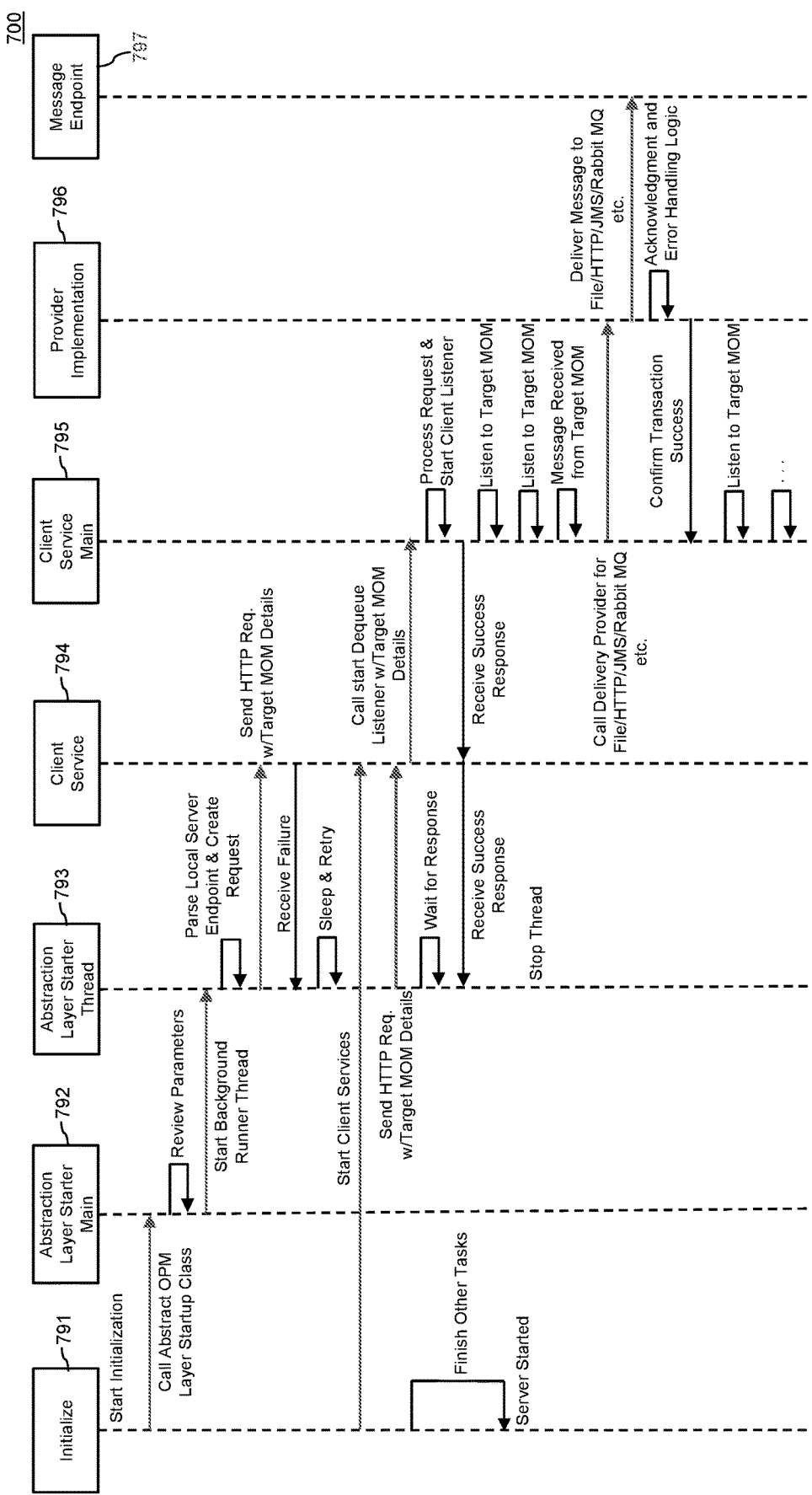
FIGS. 7 and 8 are sequence diagrams illustrating sending of messages using an enterprise message bus in an illustrative embodiment.
Figure 8:
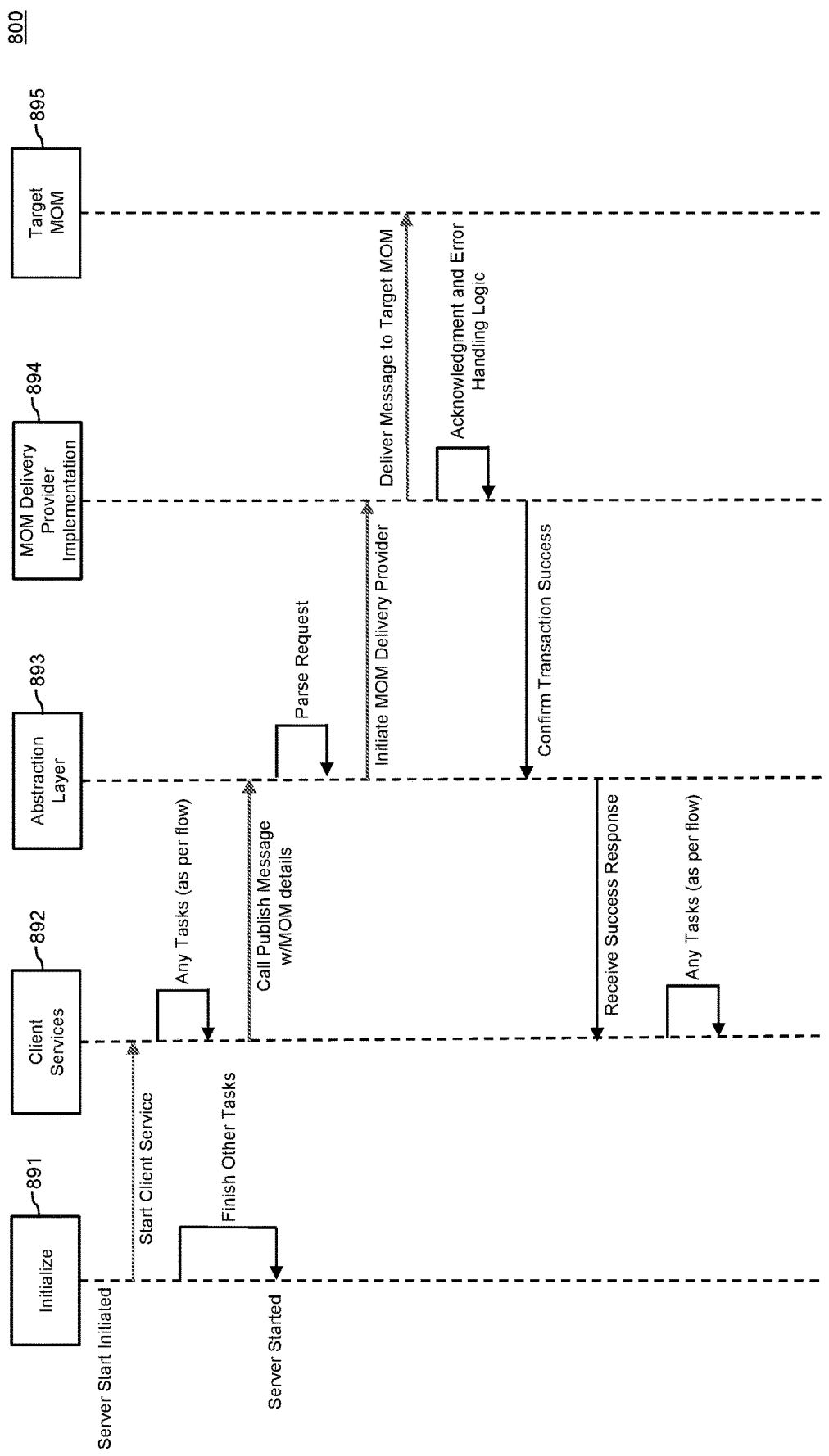

Referring to FIGS. 7 and 8, sequence diagrams 700 and 800 are shown, which illustrate sending of messages using an EMB 150/350/650. Referring to FIG. 7, in an initialize step 791, an initialization is started, and in a main abstraction layer starter step 792, an abstract object process methodology (OPM) layer startup class is called and parameters are reviewed. A background runner thread is started (abstraction layer starter thread 793), where a local server endpoint is parsed and a request is created. An HTTP request with the target MOM provider details is sent by the EMB 150/350/650 (client service 794). If a failure is received, the system sleeps and then sending of the HTTP request with the target MOM provider details is retried. Upon successful sending of the HTTP request with the target MOM provider details, client services are started and a call to start a deque listener with the target MOM provider details is initiated (client service main 795). The request is processed and a client listener is started. If a successful response is received (e.g., the message is successfully transmitted), the thread is stopped, other tasks are finished and the server is started.

If a successful response is not received, the listener continues to listen to the target MOM provider until a message is received from the target MOM provider. In response to the message from the target MOM provider, a delivery provider for file, HTTP, Java® messaging service (JMS) JMS, Rabbit MQ or other messaging protocol is called (provider implementation 796) and the message is delivered to the target MOM provider using one of the messaging protocols (message endpoint 797). Following delivery of the message to the target MOM provider, acknowledgement and error handling logic is triggered for acknowledging delivery and/or handling any errors associated with the delivery of the message. The success of the transaction is confirmed and the EMB 150/350/650 continues to listen to the target MOM provider for additional messages. In case of failure of a message, the EMB 150/350/650 will push the message back to a source queue.

Referring to FIG. 8, in an initialize step 891, a server start is initiated, and a client service is started (client services 892). Tasks are performed as per a workflow, other tasks are finished and the server is started. A call to publish a message with MOM provider details is initiated (abstraction layer 893), and the request is parsed. An initiation request is sent to a MOM delivery provider (MOM delivery provider implementation 894) similar to provider implementation 796 in FIG. 7. The message is delivered to a target MOM provider (target MOM 895). Following delivery of the message to the target MOM provider, acknowledgement and error handling logic is triggered for acknowledging delivery and/or handling any errors associated with the delivery of the message. The success of the transaction is confirmed, a success response is received and additional tasks as per a workflow are performed.

FIGS. 9A-9E depict example pseudocode for sending messages between different message—MOM providers. More specifically, the pseudocode 900 in FIGS. 9A-9E is for sending messages between IBM® MQ and Rabbit® MQ. An EMB interface configuration may specify, for example, MOM provider hosts, virtual hosts, ports, queue managers, channels, queue names and template exchanges associated with a given MOM provider.

The databases 171 and 371 in some embodiments are implemented using one or more storage systems or devices associated with the network data management platform 110. In some embodiments, one or more of the storage systems utilized to implement the databases 171 or 371 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, NAS, storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the network data management platform 110, the load balancer 115, inventory engine 120, user interface component 130, API component 140, EMB 150, polling engine 160 and databases component 170 in other embodiments can be implemented at least in part externally to the network data management platform 110, for example, as stand-alone servers, sets of servers or other types of systems coupled to the network 104. For example, the load balancer 115, inventory engine 120, user interface component 130, API component 140, EMB 150, polling engine 160 and/or databases component 170 may be provided as cloud services accessible by the network data management platform 110.

The load balancer 115, inventory engine 120, user interface component 130, API component 140, EMB 150, polling engine 160 and databases component 170 in the FIG. 1 embodiment are each assumed to be implemented using at least one processing device. Each such processing device generally comprises at least one processor and an associated memory, and implements one or more functional modules for controlling certain features of the load balancer 115, inventory engine 120, user interface component 130, API component 140, EMB 150, polling engine 160 and/or databases component 170.

At least portions of the network data management platform 110 and the components thereof may be implemented at least in part in the form of software that is stored in memory and executed by a processor. The network data management platform 110 and the components thereof comprise further hardware and software required for running the network data management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the load balancer 115, inventory engine 120, user interface component 130, API component 140, EMB 150, polling engine 160, databases component 170 and other components of the network data management platform 110 in the present embodiment are shown as part of the network data management platform 110, at least a portion of the load balancer 115, inventory engine 120, user interface component 130, API component 140, EMB 150, polling engine 160, databases component 170 and other components of the network data management platform 110 in other embodiments may be implemented on one or more other processing platforms that are accessible to the network data management platform 110 over one or more networks. Such components can each be implemented at least in part within another system element or at least in part utilizing one or more stand-alone components coupled to the network 104.

It is assumed that the network data management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the load balancer 115, inventory engine 120, user interface component 130, API component 140, EMB 150, polling engine 160, databases component 170 and other components of the network data management platform 110, and the elements thereof can each be implemented in the form of one or more LXCs running on one or more VMs. Other arrangements of one or more processing devices of a processing platform can be used to implement the load balancer 115, inventory engine 120, user interface component 130, API component 140, EMB 150, polling engine 160 and databases component 170, as well as other components of the network data management platform 110. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the network data management platform 110 to reside in different data centers. Numerous other distributed implementations of the network data management platform 110 are possible.

Accordingly, one or each of the load balancer 115, inventory engine 120, user interface component 130, API component 140, EMB 150, polling engine 160, databases component 170 and other components of the network data management platform 110 can each be implemented in a distributed manner so as to comprise a plurality of distributed components implemented on respective ones of a plurality of compute nodes of the network data management platform 110.

It is to be appreciated that these and other features of illustrative embodiments are presented by way of example only, and should not be construed as limiting in any way.

Accordingly, different numbers, types and arrangements of system components such as the load balancer 115, inventory engine 120, user interface component 130, API component 140, EMB 150, polling engine 160, databases component 170 and other components of the network data management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the network data management platform can be offered to cloud infrastructure customers or other users as part of FaaS, CaaS and/or PaaS offerings.

Figure 10:
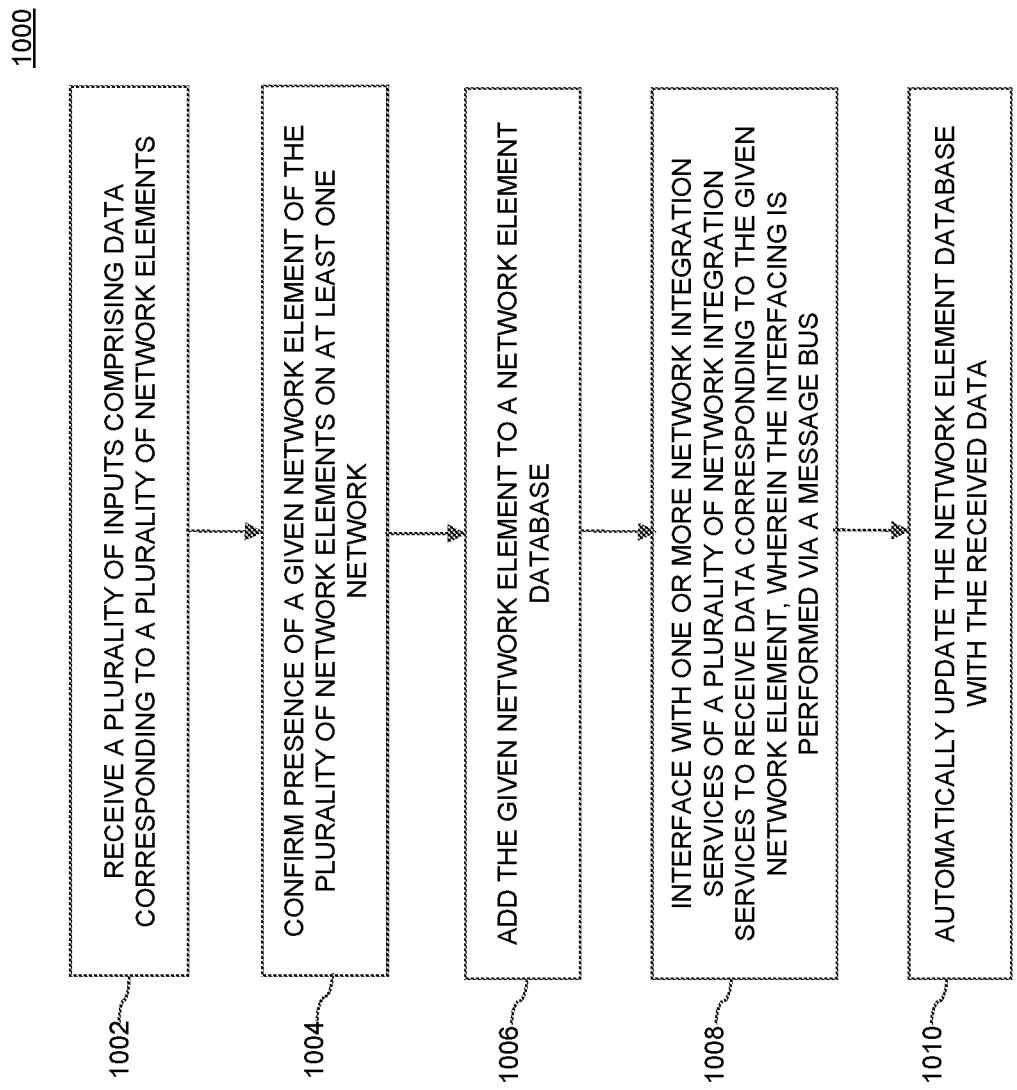
FIG. 10 is a flow diagram of a method for generating, maintaining and updating a network element inventory in an illustrative embodiment.

The operation of the information processing system 100 will now be described in further detail with reference to the flow diagram of FIG. 10. With reference to FIG. 10, a process 1000 for generating, maintaining and updating a network element inventory as shown includes steps 1002 through 1010, and is suitable for use in the system 100 but is more generally applicable to other types of information processing systems comprising a network data management platform configured for generating, maintaining and updating a network element inventory.

In steps 1002 and 1004, a plurality of inputs comprising data corresponding to a plurality of network elements are received, and the presence of a given network element of the plurality of network elements on at least one network is confirmed. In step 1006, the given network element is added to a network element database. In confirming the presence of a given network element on the at least one network, at least one polling agent is implemented to attempt to establish communication with the given network element, wherein the implementation of the at least one polling agent is performed via a message bus. The message bus is configured to transport messages between different MOM providers, which use different protocols for data exchange.

Step 1008 comprises interfacing with one or more network integration services of a plurality of network integration services to receive data corresponding to the given network element. The interfacing is performed via the message bus. In step 1010, the network element database is automatically updated with the received data. The received data comprises a physical inventory and a logical inventory of the given network element, and a data taxonomy for the network element database is variable based on content of the received data.

The plurality of network integration services are configured to monitor one or more of the plurality of network elements, manage configurations of the one or more of the plurality of network elements, manage performance of the one or more of the plurality of network elements, manage lifecycles of the one or more of the plurality of network elements and/or track physical locations of the one or more of the plurality of network elements.

In accordance with one or more embodiments, the process further includes querying the one or more network integration services to determine whether the given network element has been identified by the one or more network integration services. In response to an affirmative determination, a notification is transmitted to at least one user that the given network element has been identified by the one or more network integration services. In response to a negative determination, the one or more network integration services are triggered (i) to search for and to identify the given network element; and (ii) to monitor the given network element in response to finding and identifying the given network element.

According to one or more embodiments, the process further includes pushing data corresponding to the added given network element to the one or more network integration services, and applying one or more rules to determine which of the plurality of network integration services to push the data corresponding to the added given network element.

The plurality of inputs comprising the data corresponding to the plurality of network elements is received via a user interface and an API. The API is accessible by a user to provide a code version of the plurality of inputs comprising the data corresponding to the plurality of network elements.

It is to be appreciated that the FIG. 10 process and other features and functionality described above can be adapted for use with other types of information systems configured to generate, maintain and update a network element inventory on a network data management platform or other type of processing platform.

The particular processing operations and other system functionality described in conjunction with the flow diagram of FIG. 10 is therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a network data management platform as disclosed herein can provide a number of significant advantages relative to conventional arrangements. For example, one or more embodiments are configured to build a consistent and standard taxonomy of device capabilities and physical attributes in denormalized form to reflect real world representation of devices by creating and maintaining an authoritative network object inventory (e.g., source of truth). The embodiments advantageously implement an extension of development and operations (DevOps) for global network management engineering services activities to ensure the authoritative network object inventory is the single source (accessible via UI and API) from which the automation tools will gather the data they need to execute a DevOps pipeline.

The embodiments further provide a robust, generic and implementable interface to integration services and to other tools and processes which provide data integration and augmentation capability unavailable with existing techniques. As an additional advantage, the embodiments provide a generic and implementable interface to an EMB agnostic of different MOM vendor technologies. Conventional approaches fail to integrate with tools that provide data augmentation, and are not equipped to provide seamless operation in heterogenous environments comprising different MOM providers.

As additional advantages, the embodiments are configured to provide comprehensive audit histories for logical and physical devices, and immediate real-time feedback for users regarding the presence of network elements in a network and data corresponding to the network elements. For example, the embodiments include audit capability to perform real-time checks and provide holistic visibility of device data. The embodiments are configured to perform data augmentation by extracting data from connected tools (e.g., integration services) regarding, for example, device configurations, performance, location, service contracts, EOL and backup status. Regardless of a tool's ability to monitor a network element, the authoritative network object inventory is always ensured to be accurate because the embodiments are centered around the authoritative network object inventory, which connects to the various integration services once network elements have been added to the authoritative network object inventory.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the network data management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a network data management platform in illustrative embodiments. These and other cloud-based systems in illustrative embodiments can include object stores.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
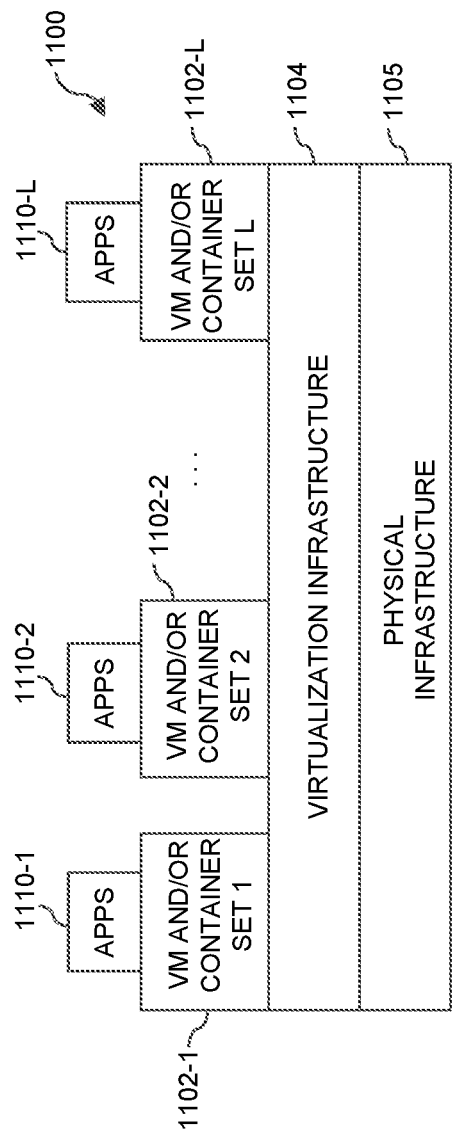
FIGS. 11 and 12 show examples of processing platforms that may be utilized to implement at least a portion of an information processing system in illustrative embodiments.
Figure 12:
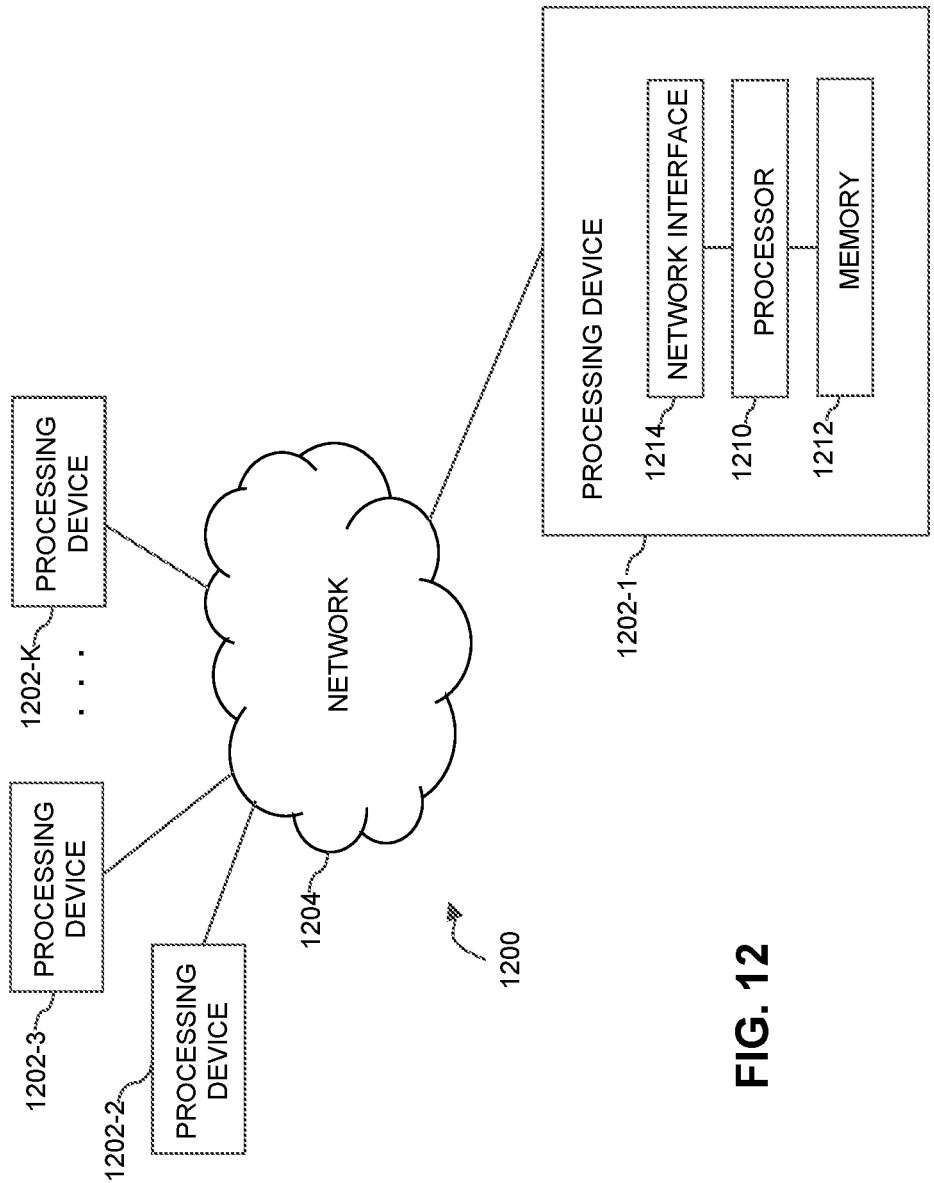

FIG. 11 shows an example processing platform comprising cloud infrastructure 1100. The cloud infrastructure 1100 comprises a combination of physical and virtual processing resources that may be utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, ... 1110-L running on respective ones of the VMs/container sets 1102-1, 1102-2, ... 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, ... 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the network data management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and network data management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   receiving a plurality of inputs comprising data corresponding to a plurality of network elements, wherein at least one of the plurality of inputs comprises a request to add a given network element of the plurality of network elements to a network element database, wherein the given network element comprises a physical element of at least one network, and wherein the network element database is connected via a message bus to a plurality of network integration services, the plurality of network integration services being configured to perform monitoring and management services for the plurality of network elements;

confirming presence of the given network element on the at least one network, wherein the confirming comprises querying one or more network integration services of the plurality of network integration services to determine whether the one or more network integration services are performing at least one of the monitoring and management services for the given network element;

adding the given network element to the network element database responsive to confirming the presence of the given network element on the at least one network;

applying one or more rules to determine whether the given network element requires one or more of the monitoring and management services associated with one or more additional network integration services of the plurality of network integration services;

requesting service for the given network element from the one or more additional network integration services responsive to a determination that the given network element requires the one or more of the monitoring and management services;

interfacing with at least one of the one or more network integration services and the one or more additional network integration services via the message bus to receive data corresponding to the given network element;

determining whether the plurality of network elements remain as parts of the at least one network, wherein the determining comprises identifying at least one network element of the plurality of network elements that is inaccessible for a threshold number of designated intervals; and automatically updating the network element database with the received data and an indication that the at least one network element has been inaccessible for the threshold number of the designated intervals;

wherein the method is performed by at least one processing platform comprising at least one processing device comprising a processor coupled to a memory.

2. The method of claim 1 wherein, in response to an affirmative determination that the one or more network integration services are performing at least one of the monitoring and management services for the given network element, the method further comprises transmitting a notification to at least one user that the given network element has been identified by the one or more network integration services.

3. The method of claim 1 wherein, in response to a negative determination that the one or more network integration services are performing at least one of the monitoring and management services for the given network element, the method further comprises triggering the one or more network integration services (i) to search for and to identify the given network element; and (ii) to at least one of monitor and manage the given network element in response to finding and identifying the given network element.

4. The method of claim 1 wherein the received data comprises a physical inventory and a logical inventory of the given network element.

5. A computer program product comprising a non-transitory processor-readable storage medium having stored therein program code of one or more software programs, wherein the program code when executed by at least one processing platform causes said at least one processing platform:

to receive a plurality of inputs comprising data corresponding to a plurality of network elements, wherein at least one of the plurality of inputs comprises a request to add a given network element of the plurality of network elements to a network element database, wherein the given network element comprises a physical element of at least one network, and wherein the network element database is connected via a message bus to a plurality of network integration services, the plurality of network integration services being configured to perform monitoring and management services for the plurality of network elements;

to confirm presence of the given network element on the at least one network, wherein, in confirming the presence of the given network element on the at least one network, the program code causes said at least one processing platform to query one or more network integration services of the plurality of network integration services to determine whether the one or more network integration services are performing at least one of the monitoring and management services for the given network element;

to add the given network element to the network element database responsive to confirming the presence of the given network element on the at least one network;

to apply one or more rules to determine whether the given network element requires one or more of the monitoring and management services associated with one or more additional network integration services of the plurality of network integration services;

to request service for the given network element from the one or more additional network integration services responsive to a determination that the given network element requires the one or more of the monitoring and management services;

to interface with at least one of the one or more network integration services and the one or more additional network integration services via the message bus to receive data corresponding to the given network element;

to determine whether the plurality of network elements remain as parts of the at least one network, wherein the determining comprises identifying at least one network element of the plurality of network elements that is inaccessible for a threshold number of designated intervals; and to automatically update the network element database with the received data and an indication that the at least one network element has been inaccessible for the threshold number of the designated intervals.

6. The computer program product according to claim 5 wherein, in response to a negative determination that the one or more network integration services are performing at least one of the monitoring and management services for the given network element, the program code further causes said at least one processing platform to trigger the one or more network integration services (i) to search for and to identify the given network element; and (ii) to at least one of monitor and manage the given network element in response to finding and identifying the given network element.

7. The computer program product according to claim 5 wherein, in response to an affirmative determination that the one or more network integration services are performing at least one of the monitoring and management services for the given network element, the program code further causes said at least one processing platform to transmit a notification to at least one user that the given network element has been identified by the one or more network integration services.

8. The computer program product according to claim 5 wherein the received data comprises a physical inventory and a logical inventory of the given network element.

9. The computer program product according to claim 5 wherein a data taxonomy for the network element database is variable based on content of the received data.

10. An apparatus comprising:
at least one processing platform comprising a plurality of processing devices;
said at least one processing platform being configured:
to receive a plurality of inputs comprising data corresponding to a plurality of network elements, wherein at least one of the plurality of inputs comprises a request to add a given network element of the plurality of network elements to a network element database, wherein the given network element comprises a physical element of at least one network, and wherein the network element database is connected via a message bus to a plurality of network integration services, the plurality of network integration services being configured to perform monitoring and management services for the plurality of network elements;
to confirm presence of the given network element on the at least one network, wherein, in confirming the presence of the given network element on the at least one network, said at least one processing platform is configured to query one or more network integration services of the plurality of network integration services to determine whether the one or more network integration services are performing at least one of the monitoring and management services for the given network element;
to add the given network element to the network element database responsive to confirming the presence of the given network element on the at least one network;
to apply one or more rules to determine whether the given network element requires one or more of the monitoring and management services associated with one or more additional network integration services of the plurality of network integration services;
to request service for the given network element from the one or more additional network integration services responsive to a determination that the given network element requires the one or more of the monitoring and management services;
to interface with at least one of the one or more network integration services and the one or more additional network integration services via the message bus to receive data corresponding to the given network element;
to determine whether the plurality of network elements remain as parts of the at least one network, wherein the determining comprises identifying at least one network element of the plurality of network elements that is inaccessible for a threshold number of designated intervals; and
to automatically update the network element database with the received data and an indication that the at least one network element has been inaccessible for the threshold number of the designated intervals.

11. The apparatus of claim 10 wherein, in response to an affirmative determination that the one or more network integration services are performing at least one of the monitoring and management services for the given network element, said at least one processing platform is further configured to transmit a notification to at least one user that the given network element has been identified by the one or more network integration services.

12. The apparatus of claim 10 wherein, in response to a negative determination that the one or more network integration services are performing at least one of the monitoring and management services for the given network element, said at least one processing platform is further configured to trigger the one or more network integration services (i) to search for and to identify the given network element; and (ii) to at least one of monitor and manage the given network element in response to finding and identifying the given network element.

13. The apparatus of claim 10 wherein the message bus is configured to transport messages between different message-oriented middleware (MOM) providers.

14. The apparatus of claim 13 wherein the different MOM providers use different protocols for data exchange.

15. The apparatus of claim 10 wherein the plurality of network integration services are configured to at least one of monitor performance of one or more of the plurality of network elements, manage configurations of the one or more of the plurality of network elements, manage the performance of the one or more of the plurality of network elements, manage lifecycles of the one or more of the plurality of network elements and track physical locations of the one or more of the plurality of network elements.

16. The apparatus of claim 10 wherein the received data comprises a physical inventory and a logical inventory of the given network element.

17. The apparatus of claim 10 wherein a data taxonomy for the network element database is variable based on content of the received data.

18. The apparatus of claim 10 wherein, in confirming the presence of a given network element on the at least one network, said at least one processing platform is further configured to implement at least one polling agent to attempt to establish communication with the given network element, wherein the implementation of the at least one polling agent is performed via the message bus.

19. The apparatus of claim 10 wherein said at least one processing platform is configured to receive the plurality of inputs comprising the data corresponding to the plurality of network elements via a user interface and an application programming interface (API).

20. The apparatus of claim 19 wherein the API is accessible by a user to provide a code version of the plurality of inputs comprising the data corresponding to the plurality of network elements.

* * * * *